United States Patent [19]

Church

[11] Patent Number: 4,572,942

[45] Date of Patent: Feb. 25, 1986

[54] GAS-METAL-ARC WELDING PROCESS

[76] Inventor: John G. Church, 7405 Kimbel St., Mississauga, Canada, L4T 3M6

[21] Appl. No.: 633,837

[22] Filed: Jul. 24, 1984

Related U.S. Application Data

[63] Continuation-in-part of Ser. No. 404,722, Aug. 3, 1982, Pat. No. 4,463,243, and a continuation-in-part of Ser. No. 349,141, Feb. 16, 1982, Pat. No. 4,464,560, said Ser. No. 404,722, is a continuation-in-part of Ser. No. 235,220, Feb. 17, 1981, abandoned.

[51] Int. Cl.$^4$ .......................... B23K 9/16; B23K 9/00
[52] U.S. Cl. .................. 219/137.420; 219/121 PY; 219/121 PK; 219/121 PP; 219/121 PS; 313/231.51
[58] Field of Search ............ 219/121 PQ, 74, 121 PY, 219/75, 121 PB, 121 PM, 76.16, 137.31, 137.62, 74, 75, 121 PS; 313/231.31–231.51

[56] References Cited

U.S. PATENT DOCUMENTS

| | | | |
|---|---|---|---|
| 2,686,860 | 8/1954 | Buck et al. | 219/74 |
| 3,534,388 | 10/1970 | Ito et al. | 219/121 PQ |
| 4,101,751 | 7/1978 | Urbanic et al. | 219/121 PQ |
| 4,291,217 | 9/1981 | Braun | 219/121 PQ |
| 4,469,932 | 9/1984 | Spiegelberg et al. | 219/121 PQ |

Primary Examiner—M. H. Paschall
Attorney, Agent, or Firm—Cullen, Sloman, Cantor, Grauer, Scott and Rutherford

[57] ABSTRACT

In a gas-metal-arc welding process, a stable plasma formation is produced by a shielding gas mixture whose flow is focused to steadily maintain the plasma formation in central alignment with the arc. Thus, the plasma energy and arc energy are combined and concentrated to yield a higher, more stable welding heat. The process is of the type that utilizes a welding gun having a consumable wire electrode that is continuously advanced towards the weld deposit as its end melts and is transferred to the weld deposit. The gas is a mixture of major proportions of each of argon and helium and minor proportions of each of carbon dioxide and oxygen, which produces a stable, approximately dome-like plasma formation in the arc gap between the electrode melting end and the weld deposit. A portion of the gas that flows through the gun nozzle and around the electrode, is directed at an acute angle towards the electrode axis within the arc gap, and is focused, by adjusting the gap length, upon a spot on the electrode axis at the weld deposit, so that it impinges upon and pressures the plasma formation inwardly into axial alignment with the arc, producing an intense heat zone in the gap.

2 Claims, 7 Drawing Figures

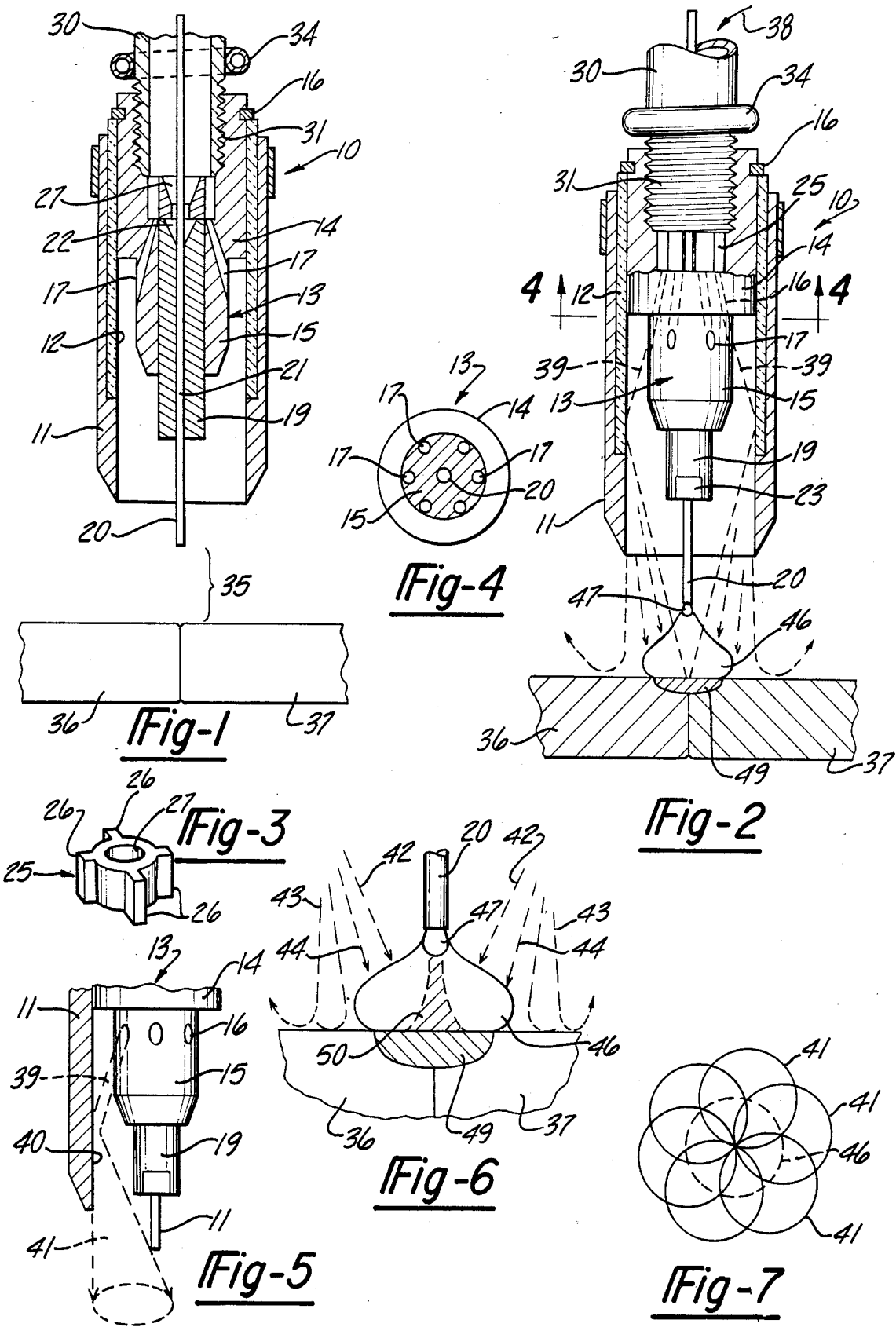

# GAS-METAL-ARC WELDING PROCESS

PRIOR APPLICATION

This application is a continuation-in-part of my application Ser. No. 404,722, now U.S. Pat. No. 4,463,243 filed Aug. 3, 1982 for a "Welding System", which, in turn, is a continuation-in-part of application Ser. No. 235,220 now abandoned, filed Feb. 17, 1981. This application is also a continuation-in-part of my application Ser. No. 349,141, now U.S. Pat. No. 4,464,560 filed Feb. 16, 1982 for a Welding Gun.

BACKGROUND OF THE INVENTION

This invention relates to a gas-metal-arc welding process of the type which utilizes a welding gun that feeds a consumable electrode wire towards the weld deposit as the end of the wire electrode melts and is transferred to the weld deposit. A shielding gas is blown through the gun nozzle, to encircle the electrode end, the arc gap and the weld deposit.

In this type of welding process, the shielding gas is ionized by the intense electrical arc voltage to produce a plasma formation or cloud within the gap between the free end of the wire electrode and the weld deposit of molten electrode material. The plasma provides a very high degree of heat. However, in prior processes of this type involving shielding gases, the plasma tends to be relatively unstable or flickering and inconsistent. In addition, it tends to move about transversely relative to the arc axis, thus dissipating or diverting much of its heat energy away from the point at which the electrode end is melted and transferred in molten drops to weld deposit zone.

As described in my prior application Ser. No. 404,722 of Aug. 3, 1982, mentioned above, the plasma can be greatly stabilized and its heat better kept within the desired zone, by utilizing a four gas mixture comprising major proportions of each of argon and helium, and minor proportions of each of carbon dioxide and oxygen. The gas mixture within certain ranges, I have discovered, produces more effective arc control and, in particular, a stabilized or consistent, plasma.

Further, in my application Ser. No. 349,141, relating to a welding gun, I have disclosed a welding gun having a gas diverter, with passageways arranged at an acute angle relative to the axis of the gun for blowing diverging streams of the gas mixture within the gun nozzle to provide a curtain of gas exiting from the nozzle. The gas curtain shields and surrounds the electrode, the arc and the weld deposit.

This present application concerns the focusing or aiming of a substantial portion of the gas flowing from the gun nozzle which tends to form a steady, consistent arc plasma acting against transverse movement relative to, and align with the arc axis. By maintaining the plasma field centered on the arc axis, the welding zone heat is greatly intensified to produce better welds, including continuous fusion, controlled penetration, with faster welding speeds.

SUMMARY OF THE INVENTION

The invention herein relates to controlling the location of the plasma field, thereby producing an intense heat zone in the welding gap of a gas-metal-arc welding process. This is accomplished, by first providing a relatively stable plasma due to using a gas mixture formed of major proportions of argon and helium and minor proportions of carbon dioxide and oxygen, Second, the flow of the shielding gas is focused or aimed so that at least a portion is directed inwardly towards a spot on the arc axis. This applies external pressure on the plasma formation towards that spot and consequently, maintains the plasma field in a steady, centralized relationship with the arc. Aligning the plasma field with the arc axis has a cumulative effect of adding together and concentrating the energy of the plasma and the arc to provide an unusually intensely heated zone. This zone permits controlled penetration, complete fusion, faster welding, and better welding results.

An object of this invention is to make more complete use of the available energy of the plasma and of the arc by combining and concentrating them by inwardly focusing part of the force or pressure exerted by the stream of shielding gas into the plasma forming zone.

Another object of this invention is to focus part of the flowing shielding gas stream upon a spot or area on the projected axis of the electrode in the arc gap so as to reduce swirling of the gases, which could destabilize the plasma field, and to maintain the plasma field in alignment with the arc.

Still a further object is to intensify the available welding heat by fully combining the plasma energy and the arc energy so as to produce better welding results, such as by reducing impurities from the electrode appearing in the weld, producing deep penetration welds in fillet and butt joints, permitting higher current densities to be used than those possible with other gas shielded arc processes, better controlling the transferring droplets in the globular free flowing movement of the weld material to the weld deposit, reducing or eliminating spatter, permitting welding of rusty or oxidized ferrous plates without the defects and poor mechanical properties produced when welding with prior gas shielded metal arc processes, reducing the oxide in the weld to obtain a better quality weld deposit, etc.

These and other objects and advantages of his invention will become apparent upon reading the following description, of which the attached drawings form a part.

DESCRIPTION OF DRAWINGS

FIG. 1 is a cross-sectional elevational view of the welding gun positioned over a pair of plates to be welded together.

FIG. 2 is an elevational view, partially in cross-section, schematically showing the welding operation.

FIG. 3 is a perspective view of the spacer element used in the welding gun.

FIG. 4 is a cross-sectional view of the diffuser, taken as if in the direction of arrows 4—4 of FIG. 2.

FIG. 5 is a schematic, fragmentary view of part of the welding gun illustrating the travel of a stream of gas through the gun.

FIG. 6 is a schematic, enlarged view of the arc gap, plasma formation and intense heat zone, with the gas flow illustrated schematically by arrows.

FIG. 7 is a schematic view showing the overlapping pattern of the air streams flowing through the welding gun.

DETAILED DESCRIPTION

FIG. 1 illustrates, in cross-section, a welding gun head 10. The gun includes a tubular nozzle 11 having a conventional insulating sleeve 12 forming a substantial part of its interior wall.

A shielding gas diffuser 13, which has a central bore, is arranged within the nozzle. The diffuser has an enlarged head portion 14 which tightly fits within the nozzle. The diffuser also includes an integral, narrow lead end portion 15 which extends within the nozzle, but is spaced radially inwardly of the nozzle wall so as to provide an annular space through which gas may flow. A series of gas conducting passageways 17 are formed in the diffuser.

The diffuser is held in position within the nozzle by means of an O-ring or stop ring 16 arranged within a corresponding channel at its upstream or enlarged head end. The ring engages the nozzle insulating sleeve to act as a stop. In addition, a conventional pipe clamp 18 which surrounds the sleeve may be circumferentially tightened to hold the sleeve and the diffuser head together. The pipe clamp is formed of a metal strap wrapped around the sleeve with a fastener that draws the ends of the strap together. This is conventional, and therefore, is not shown.

A copper welding tip 19 is arranged within the bore of the diffuser narrow lead end portion. A continuous wire electrode 20 slides through the bore 21 of the welding tip 19. To facilitate the movement of the electrode through the tip bore, a conical entry end 22 is formed on he upstream size of the tip. Also, to facilitate removing the tip from or inserting the tip in the bore of the diffuser, tool flats 23 may be formed on its end.

A spacer 25 is arranged within the bore of the enlarged head of the diffuser. This spacer, as illustrated in perspective in FIG. 3, is formed of a cylindrical shape having spaced apart fins 26. The spacer enlarged central hole 27 receives the wire welding electrode 20.

A copper tube 30, having a threaded end 31 is threadedly engaged within the bore of the diffuser enlarged head 14, as illustrated in FIGS. 1 and 2. The wire electrode extends through the tube. In addition, the tube carries the electrical current and the shielding gas. Conventionally, the tube extends a sufficient distance to form a handle for the welding gun, which may be covered with suitable insulation for grasping the gun by hand. The tube is then connected to a conduit which in turn is connected to the source of gas, such as typical gas "bottles" which carry compressed gas. In addition, the electrical source is connected to the copper tube. Since this construction is conventional, no further description of it is given here.

A water conduit, such as a copper tube 34, is wrapped around the copper tube 30, for carrying circulating cool water for vigorous cooling of the head.

OPERATION

In normal welding operation, such as for the globular, free flight transferance welding method, the free end of the wire electrode is gapped or spaced away from the workpiece. Thus, FIG. 1 schematically illustrates the space or gap 35 between the electrode end and a pair of steel plates 36 and 37 which are placed together for welding them into one unit.

The shielding gas is flowed from the storage bottles, through conventional control valves (not illustrated) and through the copper tube 30 (see arrow 38 in FIG. 2) into the spaces between the fins 26 of the spacer 25 and then, through the passages 17 in the diffuser. These gas passageways are arranged at a sharp, acute angle relative to the axis of the gun, that is, relative the axis of the welding electrode. A number of such passageways are spaced evenly apart around the diffuser lead end portion. In the example in FIG. 4, six such passageways are provided and these are radially equally spaced from the center lines of the diffuser and the electrode. Also, they are aligned with each other transversely of the electrode axis. These passageways may be at about a 15–18° angle, so as to form a diverging series of passageways for providing separate streams of flowing gas.

Each of the streams 39 (see FIG. 5) flow in a diverging path from its respective passageway 17 until it contacts the inner wall 40 of the nozzle. There, an inner portion 42 of the gas stream reflects from the nozzle at a downstream converging acute angle that is aimed or focused towards a spot on the axis of the electrode, but in the gap 35. The remaining gas in the stream reflecting from the inner wall of the nozzle may fan out to provide an outer portion 43 which is roughly parallel to or spreads outwardly somewhat relative to the axis of the electrode. The inner and outer gas portions are schematically illustrated by arrows 41 and 43, with the intermediate gas portions shown by arrows 44.

When the electrical power is actuated and sufficient power is transmitted through the copper tube 30 and therefore, through the electrode wire 20, the flow of electrons through the gap 35 ionizes the gas to form a plasma. The plasma field or formation 46, as illustrated in FIGS. 2 and 6, is generally located in the gap. Such plasma produces considerable heat to enhance the welding process. The arc through the gap between the end of the electrode and the workpieces, produces melted droplets 47 which are transmitted through the gap and land upon the workpiece in what is commonly called a weld deposit or weld pool 49. The formation of droplets and the transmittal of the droplets through the gap is very rapid and is continuous.

In a typical gas-metal-arc welding operation, the plasma formed by the shielding gas, which may be one gas or a mixture of several gases, is unstable. That is, it tends to flicker, and to roam or move transversely about, exacerbated by the normal movement of the welding gun along the direction of the area to be welded. Thus, the invention herein contemplates utilizing a gas mixture which produces a stable plasma formation, that is, one which tends to be steady without the flickering or the rapid quantity change, i.e., enlargement and contraction, which is typically found in this type of plasma formation.

The gas mixture contemplated is formed essentially of between about 40–70% argon; between about 25–60% helium; between about 3–10% carbon dioxide and between about 0.1 to 2% oxygen. Thus, the mixture generally comprises major proportions of each of argon and helium and minor proportions of each of carbon dioxide and oxygen.

By way of example, for welding mild and low alloy steel, which is a common material in welding, a preferred mixture comprises about 65% argon, about 26.5% helium, about 8% carbon dioxide and about 0.5% oxygen.

The stable, approximately dome-like or bell-like shaped plasma field or formation, tends to be off center or to wander off center of the electrode axis. Thus, this process centers the plasma formation upon the electrode or arc axis by the impingement of the inner portion of the shielding gas flow which is aimed or directed at the acute angle towards the axis. As seen in FIG. 6, the arrows, which schematically represent the gas flow, impinge upon the plasma field, tending to mechanically push or pressure the plasma field into a centralized position on the arc axis. This continuing gas force maintains the centralized alignment between the arc and the plasma.

As illustrated in FIGS. 4 and 7, there are preferably six passageways equally spaced around the diffuser. Each passageway produces a separate stream of flowing gas 39 (see FIG. 5). The stream 39 is reflected into a forwardly directed stream 41 which produces a roughly circular area of contact with the workpiece. As shown in FIG. 1, the focusing of the several streams, causes each of the generally circular areas of contact to overlap the axis of the electrode. Consequently, the overlapped, central portion which is aligned with the arc axis, provides a central zone of intense heat. This is schematically illustrated by the shaded portion 50 in FIG. 6. This superheated or intensely heated central zone 50 provides considerably greater heat than is normally expected.

The concentrated heated zone, permits a faster welding operation and produces a better quality weld result. This superheated zone results from the combining of the energy of the arc and of the plasma in an aligned central area. The two energies appear to have a cumulative effect on each other and produce an unexpectedly, sustained, intense heat. This does not take place in normal plasma formation of shielding gases where the plasma heat is normally off center relative to the arc and ordinarily wanders relative to the arc axis.

Although the electrode wire may be varied, depending upon the type of weld desired, one example of an electrode wire is 0.032 diameter wire, identified as AWS A5.18, classification E 70S-6. When used to weld mild steel, an amperage of 450–500 amps and a voltage of about 31–32 volts may be used to give a current density which is approximately 559,560 amps per square inch.

The speed of welding gun travel along the bead may be varied, but an example, would be 23–24 inches per minute, with the above described conditions, to weld mild steel plates. This produces complete fusion of two plates, 5/16 inch thick, with complete penetration and fusion, which is not possible to accomplish with conventional gas mixtures. In such instance, the gas flow would be in the range of 30–35 cubic feet per hour with a gas pressure of about 30 P.S.I. gage. The diffuser passageways through which such gas passes, for example, may be 5/64ths of an inch diameter with an annular space of about 3/32 inch caused by a ¾ inch I.D. nozzle and a 9/16 inch O.D. on the lead end of the diffuser. Preferably, the gun is held so that the gas focuses on a spot on the arc axis that is on the surface of the weld deposit.

Having fully described an operative embodiment of this invention, I now claim:

1. A gas-metal-arc welding process of the type using a consumable wire electrode continuously advanced axially longitudinally towards the weld deposit, with the electrode end spaced from the weld deposit forming an arc gap therebetween, comprising the steps of:

using a welding gun having a tubular nozzle surrounding, but radially spaced from, the electrode, said nozzle having a substantial cylindrical inner wall surface;

surrounding the electrode end and the gap with a flow of gas which is centered upon the electrode axis and which is directed towards the weld deposit, with the gas formed of a mixture of major proportions of argon and helium and minor proportions of carbon dioxide and of oxygen;

forming said gas flow by flowing a number of separate gas streams from passageways arranged within the nozzle around the electrode axis and spaced radially outward therefrom at substantially equal distances, with the exits of said passages arranged at a downstream diverging acute angle relative to the electrode axes;

impinging the separate streams upon the inner tubular wall surface of the nozzle so that the first portions of the streams are redirected by said wall surface to converge and focus radially inwardly at an acute angle towards a spot on the electrode axes in the gap near the weld pool, while second portions of each of the streams are redirected by said wall surface into a substantially cylindrical, annular column of flowing gas parallel to the electrode axis and surrounding said converging first stream portions;

passing electrical current of sufficient power through the electrode to produce a welding arc in the gap;

the gas mixture producing a relatively stable, generally dome-shaped plasma formation in the gap;

steadily centering the plasma formation concentrically about the electrode axis by impinging said converging first stream portions of the gas flow against the plasma formation for applying a substantially steady, axially inwardly directed pressure upon the plasma formation aimed towards said spot;

and adjusting the electrode end gap so that the converging stream portions focus substantially towards the spot where the arc axis and weld deposit intersect;

whereby the energy of the arc and the plasma combine together and are concentrated to produce an increased intensity heat zone in the gap.

2. A gas-metal-arc welding process as defined in claim 1 and said gas comprising essentially between about 40–70% argon, between about 25–60% helium, between about 3–10% carbon dioxide and between about 0.1–2% oxygen.

* * * * *